United States Patent [19]

Sijbers

[11] Patent Number: 4,649,235
[45] Date of Patent: Mar. 10, 1987

[54] TELEPHONE CIRCUIT WITH A CLASS-B AMPLIFIER OUTPUT STAGE

[75] Inventor: Peter J. M. Sijbers, Eindhoven, Netherlands

[73] Assignee: U.S. Philips Corporation, New York, N.Y.

[21] Appl. No.: 680,430

[22] Filed: Dec. 11, 1984

[30] Foreign Application Priority Data

Dec. 15, 1983 [NL] Netherlands ............... 8304312

[51] Int. Cl.$^4$ ............................................. H04M 1/60
[52] U.S. Cl. ..................................... 379/348; 330/265;
330/267; 379/395
[58] Field of Search ............... 179/70, 77, 81 R, 81 B,
179/16 AA, 18 FA, 16 F; 330/267, 265, 255

[56] References Cited

U.S. PATENT DOCUMENTS 3,753,137  8/1973  Mattfeld et al. ............... 330/267 X
3,936,614  2/1976  Suntop ........................... 179/16 EC
4,015,212  3/1977  Miyata ............................ 330/267 X
4,058,775 11/1977  Crowle ............................. 330/267
4,431,972  2/1984  Ishii et al. ........................ 330/267
4,446,443  5/1984  Johnson et al. ................... 330/257

Primary Examiner—Gene Z. Rubinson
Assistant Examiner—R. Vaas
Attorney, Agent, or Firm—Thomas A. Briody; William J. Streeter; Leroy Eason

[57] ABSTRACT

The telephone amplifier of an audio transmission circuit comprises a class-B output stage as a result of which the required supply current of this amplifier is considerably lower than with prior art telephone amplifiers. A distorting voltage produced by the current signal in the supply current of the glass-B output stage does not affect the output signal of the telephone amplifier because the input stage and the output stage each comprise their own setting circuits which produce mutually independent setting voltages.

2 Claims, 2 Drawing Figures

TELEPHONE CIRCUIT WITH A CLASS-B AMPLIFIER OUTPUT STAGE

BACKGROUND OF THE INVENTION

1. Field of the Invention

The invention relates to an audio transmission circuit comprising a telephone amplifier, for an electronic telephone set having line terminals for connecting the set to a subscriber line, this set being fed with direct current via the subscriber line and further comprising, arranged between the line terminals, a series arrangement of a line terminating impedance determining the alternating current impedance of the set, and a supply capacitor for supplying the audio transmission circuit, this audio transmission circuit having a supply input for connection to the junction between the line terminating impedance and the supply capacitor.

2. Background of the Invention

Such an audio transmission circuit is disclosed in the non-prepublished United Kingdom patent application No. 8,224,347.

In addition to a transmission circuit for audio signals, electronic telephone sets often comprise further electronic circuits such as, for example, a circuit for generating tones for tone-push button dialling, a circuit for automatically repeated dialling, memory circuits or the control circuits associated with a display.

With telephone sets whose direct current supply is effected via the subscriber line, the total current available for supplying this circuit is limited. The available supply current is determined inter alia by the resistance, and thus by the length of the subscriber line. More specifically with the maximum subscriber line length allowed by the administration, it is possible that insufficient direct current is available to feed all the electronic circuits of the telephone set simultaneously.

SUMMARY OF THE INVENTION

The invention has for its object to provide an audio transmission circuit of the type described in the opening paragraph for which the supply of direct current required is considerably less than the current required for these prior art audio transmission circuits, the other performances of this circuit being the same.

To accomplish this object, the audio transmission circuit according to the invention has a telephone amplifier which is in the form of a multi-stage amplifier comprising a class-B output stage and the input stage and the output stage of the telephone amplifier each comprise their own setting circuit for obtaining a mutually independent d.c. voltage setting of each each of the associated stages.

Because of the use of a class-B output stage in the telephone amplifier substantially no direct current is required for setting this output stage. Using a class-B output stage has the additional advantage that this stage can be loaded with earpieces of very different impedances. Without further measures this impedance may have a value between approximately 150Ω and 1000Ω. However, at its supply terminals a class-B amplifier stage evidences an alternating current impedance which is much lower than the impedance of a class-A amplifier stage, this alternating current impedance furthermore depending on the signal amplitude. To protect the line terminating impedance of the telephone set for alternating current from being affected by the poorly defined impedance between the supply terminals of the class-B stage, it is necessary to connect the supply input of the audio transmission circuit to the junction of the line terminating impedance and the supply capacitor.

The signal-dependent alternating current component which, in the class-B stage, inevitably occurs in the supply current, produces, however, an a.c. voltage across the line terminating impedance. As the output of the telephone amplifier must be adjusted to a quiescent value of approximately half the supply voltage, the setting voltage of the d.c. voltage level of the amplifier is directly derived from the supply voltage, for example with the aid of a voltage divider. However, this results in this setting voltage also including an a.c. voltage component.

If this signal-dependent a.c. voltage component were amplified by the telephone amplifier this would result in distortion of the output signal. This distortion is caused because one input of the input stage which is in the form of a differential amplifier is connected to a (complex) drive network having an impedance which differs considerably from the impedance at the other input of the input stage. Thus, a "common-mode" signal applied by the d.c. voltage setting to the inputs of the input stage is converted into a "differential mode" signal which is amplified further. This type of output signal distortion is prevented in the audio transmission circuit according to the invention by giving the input stage of the telephone amplifier a d.c. voltage setting which is independent of the output stage.

The invention will now be described in detail by way of example with reference to the accompanying Figures, corresponding elements in the different Figures having been given the same reference numerals.

DESCRIPTION OF THE PREFERRED EMBODIMENTS

Figure 1:
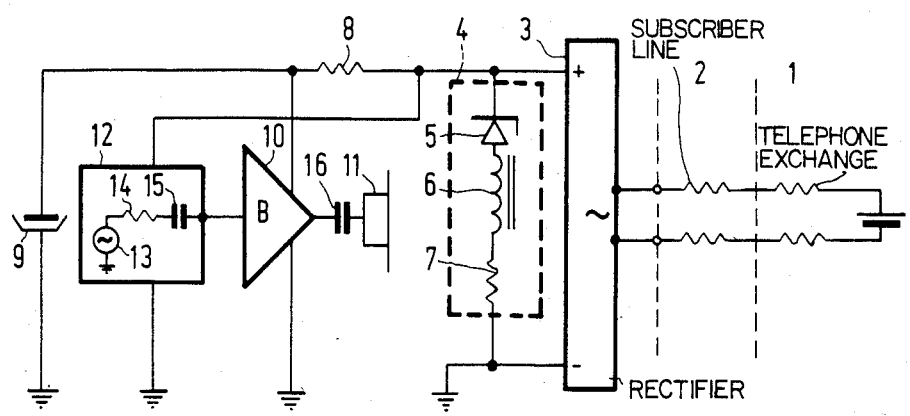
FIG. 1 shows a telephone system in which the interconnection of the relevant elements of an audio transmission circuit according to the invention are illustrated.

FIG. 1 shows a portion of a telephone set connected to a telephone exchange 1. This telephone exchange 1 is symbolically denoted by a d.c. voltage source, which provides the supply for the telephone set, and two supply resistors arranged in series therewith. The connection between the telephone set and the telephone exchange is formed by the two-wire subscriber line 2, which is symbolically represented by two resistors each representing the resistance of one wire. In the telephone set the subscriber line 2 is connected to a rectifer 3, which is provided to render the set insensitive to polarity changes at the input terminals.

A bipolar d.c. voltage stabilizing circuit 4 is connected to the d.c. voltage side of rectifier 3. This circuit is formed by a series arrangement of a Zener diode 5, an inductance 6 and a resistor 7.

A series arrangement formed by a line terminating resistor 8 and a supply capacitor 9 is arranged in parallel with the stabilizing circuit 4. The supply circuit of telephone amplifier 10 is connected parallel to supply capacitor 9. The series arrangement of capacitor 16 and earpiece 11 is connected to the output of amplifier 10.

Telephone amplifier 10 is driven by a control circuit 12. This control circuit is formed by the local hybrid of the telephone set in combination with the subscriber line via which the speech signal is transmitted from the exchange to the subscriber. The signal behaviour of this control circuit 12 can be approximated by the signal behaviour of a voltage source having a series impedance. Therefore, control circuit 12 is symbolically represented by a series arrangement of a signal voltage source 13, a resistor 14 and a capacitor 15. To enable control circuit 12 to receive the signal from the subscriber line, it is also connected to the junction of the line terminating impedance 8 and stabilizing circuit 4.

Stabilizing circuit 4 has for its function to stabilize the voltage level at the d.c. voltage side of rectifier 3. Because of the presence of inductance 6, stabilizing circuit 4 has a high impedance for speech signals. Although inductance 6 is shown in FIG. 1 as a coil, this element may alternatively be formed in a way known per se as an active circuit, which is necessary for the integrability of the transmission circuit.

For d.c. voltages higher than the breakdown voltage of zener diode 5 (for example 4 V) stabilizing circuit 4 behaves, in combination with the supply battery of the telephone exchange and the subscriber line, as a d.c. voltage source comprising a series resistance whose value is substantially equal to that of resistor 7, for example 20Ω. So instead of a circuit 4 an equivalent d.c. voltage source may be substituted, as is shown in FIG. 2.

Supply capacitor 9 is provided to supply in combination with line terminating resistor 8 the audio transmission circuit with supply energy. Together with line terminating resistor 8 this capacitor forms a low-pass filter which causes the voltage on the connection between this capacitor and line terminating resistor 8 to have no a.c. voltage component having a frequency in the audio frequency range. The capacitance value of capacitor 9 should be chosen such that across the whole audio frequency range this value has substantially no influence on the value of the alternating current impedance as this impedance is seen from the subscriber line. With a capacitance value of, for example, 100 μF, the impedance of this capacitor at the lowest audio frequency of 300 Hz is equal to approximately 5Ω, which is an acceptable value.

Figure 2:
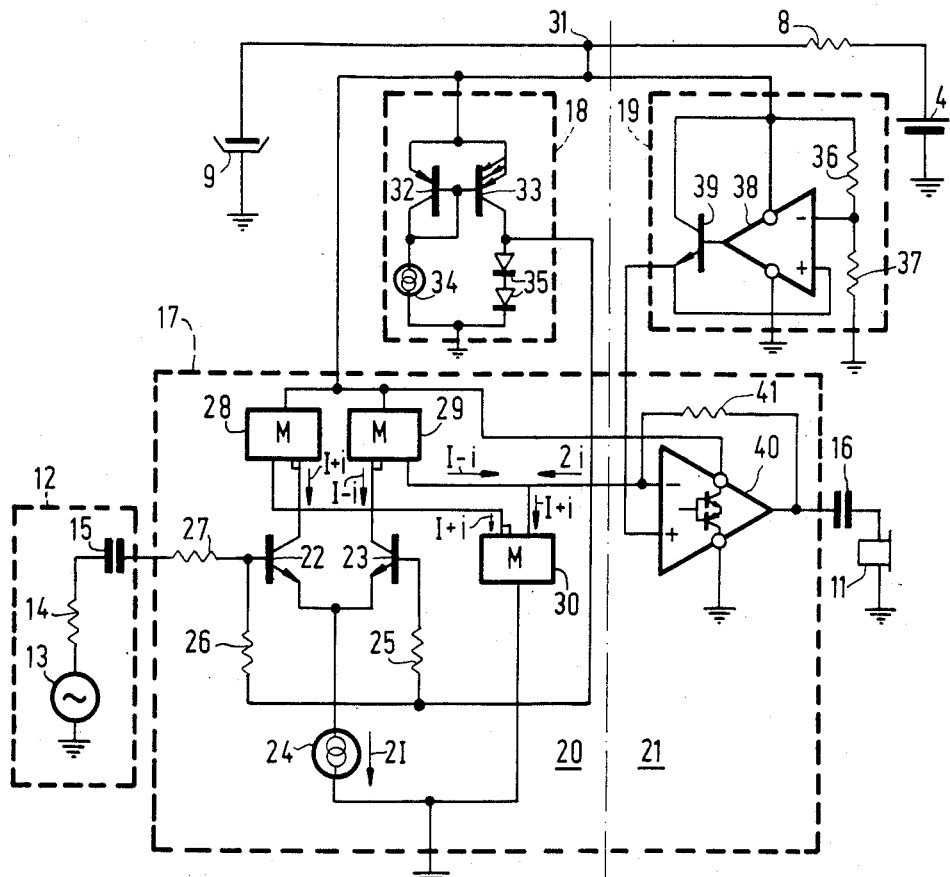
FIG. 2 shows a more detailed embodiment of the telephone amplifier of the audio transmission circuit according to the invention.

FIG. 2 shows amplifier 10 in greater detail. Here amplifier 10 is formed by an amplifying section 17, a setting circuit 18 for input stage 20 and a setting circuit 19 for output stage 21.

Input stage 20 is constituted by a differential stage formed by two transistors 22 and 23 connected to a common current source 24. One side of a resistor 25 is connected to the base of transistor 23 and one side of a resistor 26 is connected to the base of transistor 22. The two other sides of the resistors 25 and 26 are interconnected and connected to the output of setting circuit 18. In addition, the base of transistor 22 is connected to one side of a resistor 27, whose other side constitutes the control input of the input stage 20. The collector of transistor 22 is connected to the control input of a current mirror 28, whose output is connected to the control input of a current mirror 30. The collector of transistor 23 is connected to a current mirror 29, whose output is connected to the output of current mirror 30. Both last-mentioned outputs constitute the signal output of the input stage 20, which signal output is connected to the signal input of output stage 21.

Setting circuit 18 supplies from its output a fixed voltage which does not depend on the voltage of supply point 31 which is formed by the junction of supply capacitor 9 and line terminating resistor 8. Setting circuit 18 is formed in a manner known per se by a transistor 32, whose base is connected to the base of a transistor 33. The emitters of the transistors 32 and 33 are interconnected and connected to supply point 31. The collector of transistor 32 is connected to one side of a reference current source 34, the collector of transistor 33 is connected to the anode of a first diode which forms a series arrangement 35 in combination with a second diode. The other side of reference current source 34 is connected to the cathode of the second diode and to the system reference voltage. The output of setting circuit 18 is formed by the junction between the collector of transistor 33 and the anode of the first diode of series arrangement 35.

Setting circuit 19 supplies from its output a voltage which is equal to half the voltage difference between the supply point 31 and the system reference voltage. This circuit comprises a series arrangement of two equal resistors 36 and 37, which series arrangement is connected between the supply point 31 and the system reference voltage. The junction of the resistors 36 and 37, which together form a voltage divider for the voltage at supply point 31, is connected to the inverting input of an amplifier 38, which operates as a buffer amplifier. The output of amplifier 38 is constituted by a transistor 39, whose collector is connected to the supply point 31 and whose emitter is connected to the non-inverting input of amplifier 38. The direct current setting of transistor 39 can, for example, be effected with the aid of a current source arranged in series with the emitter; this setting is not shown in FIG. 2. The output of setting circuit 19 is constituted by the emitter of transistor 39; this output is connected to the setting input of output stage 21.

Output stage 21 comprises a class-B amplifier stage 40, as is shown symbolically by means of a series arrangement of two transistors in a "push-pull" configuration between the supply terminals of amplifier stage 40. This amplifier stage has an inverting input to which the output signal of input stage 20 is applied, and a non-inverting input to which the setting voltage for the d.c. voltage level is applied. A feedback resistor 41 is connected between the output of amplifier stage 40 and its inverting input. Output stage 21, input stage 20 and the setting circuits 18 and 19 are fed from the supply point 31.

The output voltage of the setting circuit 18 which constitutes the setting voltage for the d.c. voltage level of input stage 20 is highly independent of voltage variations at supply point 31, provided the voltage of this supply point remains above a predetermined value, for example 1.5 V (twice the diode forward voltage of 0.65 V and 0.2 V transistor saturation voltage). This d.c. voltage stabilization is obtained because of the fact that the current from reference current source 34, which is already little affected by the voltage at supply point 31, is multiplied by a predetermined constant factor in the transistors 32, 33 arranged as a current mirror and is thereafter passed through the series arrangement 35 of two forward-connected diodes. Any small residual current variations are thus substantially not converted into variations of the output voltage.

The d.c. voltage level of input stage 20 is set with the aid of this constant output voltage via resistors 25 and 26. As no voltage ripple is present anymore across this output voltage, the possibility that an output signal of input amplifier 20 is produced is excluded. If a ripple were present, this would result in an output signal as the two inputs of the differential amplifier evidence a mutually different impedance because of the fact that signal source 12 is connected to one of the inputs.

A signal which is applied by signal source 12 to the base of transistor 22 via resistor 27 is converted by the differential stage into, for example, an increase in the current of the collector of transistor 22 and an equally large decrease of the current in the collector of transistor 23. The current increase of transistor 22 is reflected by current mirror 28 and applied to the control input of current mirror 30; this current increase is applied to the input of output stage 21 via the output of current mirror 30. The decrease in the current from transistor 23 is converted by current mirror 29 into a decrease in the output current, which also results in a current supply of equal value to the input of output stage 21. Thus, a current which in the small-signal approximation is directly proportional to the current variation in the transistors 22 and 23 and consequently to the signal of signal source 12, is applied to output stage 21.

The output voltage of setting circuit 19 is kept equal to the voltage produced by voltage divider 36 and 37 by buffer amplifier 38 together with transistor 39. The resistors 36 and 37 each have a resistance value of for example 50 kΩ. Buffer amplifier 38 is provided to prevent current drain from this highly resistive voltage divider. The output impedance of the setting circuit 19 is still further reduced by output transistor 39. Consequently, this second circuit can also be used to apply current to further elements of the audio transmission circuit, not shown in the Figure.

The output voltage of setting circuit 19 is applied to the non-inverting input of class-B output stage 40. The output of output stage 40 is connected to the inverting input via feedback resistor 41, so that substantially no d.c. voltage difference is present anymore between the inverting and the non-inverting inputs. Since the inverting input is driven from a highly resistive node, this implies that the output also receives the same output voltage as the outputs of setting circuit 19. Any voltage ripple across the output of setting circuit 19 in response to current variations in the supply of amplifier 40 at the rate of the telephone signal is conveyed substantially without voltage gain to the output of output stage 40. However, this voltage ripple does not cause any noticeable distortion there because this voltage ripple is substantially not amplified.

The use of mutually independent setting or biasing circuits for input stage 20 and for output stage 21 prevents current variations in the supply of the class-B output stage 21 from being converted into an interfering signal distorting the output signal of the telephone amplifier 17.

What is claimed is:

1. In a telephone circuit, having DC supply means:
   a telephone amplifier connected to said DC supply means and comprising
   an input stage;
   a class-B amplifier output stage connected to said input stage for furnishing an output signal;
   first DC operating level setting means connected to said input stage for setting a first DC operating level for said input stage;
   and second DC operating level setting means connected to said class-B amplifier output stage for setting a second DC operating level for said class-B amplifier output stage which is independent of said first DC operating level;
   said second level setting means comprising voltage divider means connected to said DC supply means and having a voltage divider tap, difference amplifier means having a first and second input and an output, said first input being connected to said voltage divider tap, and means for connecting said output to said second input and to said class-B amplifier output stage;
   whereby said output signal is substantially unaffected by current variations of said DC supply.

2. A telephone circuit combination as set forth in claim 1, wherein said means for connecting said output comprises a transistor having an emitter-base circuit connected between said output and said second input of said difference amplifier means and a collector connected to said DC supply.

* * * * *